United States Patent [19]

Rees

[11] Patent Number: 5,450,157
[45] Date of Patent: Sep. 12, 1995

[54] IMAGING SYSTEM USING A GRADIENT INDEX LENS ARRAY WITH IMPROVED DEPTH OF FOCUS

[75] Inventor: James D. Rees, Pittsford, N.Y.
[73] Assignee: Xerox Corporation, Stamford, Conn.
[21] Appl. No.: 161,630
[22] Filed: Dec. 6, 1993
[51] Int. Cl.[6] .............................................. G02B 5/17
[52] U.S. Cl. ...................................... 355/1; 355/67; 359/652
[58] Field of Search ..................... 355/1, 67; 359/652, 359/653, 654

[56] References Cited

U.S. PATENT DOCUMENTS

| | | | |
|---|---|---|---|
| 3,658,407 | 4/1972 | Kitano et al. | 350/96 B |
| 3,947,106 | 3/1976 | Hamaguchi et al. | 355/1 |
| 4,193,679 | 3/1980 | Mochizuki et al. | 355/1 |
| 4,509,826 | 4/1985 | Araghi | 350/286 |
| 4,571,022 | 2/1986 | Lama et al. | 355/1 |
| 4,801,978 | 1/1989 | Lama et al. | 355/69 |
| 5,159,656 | 10/1992 | Goldstein | 355/1 |
| 5,166,999 | 11/1992 | Rees et al. | 385/120 |

OTHER PUBLICATIONS

William Lama, "Optical properties of GRIN fiber lens arrays: dependence on fiber length," Applied Optics, Aug. 1; 1982, vol. 21, No. 15, pp. 2739–2746.

Primary Examiner—Richard A. Wintercorn
Assistant Examiner—D. P. Malley

[57] ABSTRACT

An imaging system is disclosed which incorporates a gradient index lens array to transmit focused light onto an image medium with increased Depth of Focus (DOF) and no loss of radiometric efficiency. The lens array is first constructed so that its exit pupil is generally symmetrical. This first step increases the radiometric efficiency of the lens array relative to prior art lens arrays. In a second step, the DOF is increased by reducing a quantity $n_0\sqrt{A}R$ which is associated with the lens, $n_0$ being the axial refractive index of the fibers comprising the lens array, $\sqrt{A}$ being the gradient index constant of the material comprising the lens array and R being the radius of the individual optical rods, As this quantity is reduced, the DOF increases consistent with a trade off of reduced radiometric efficiency. Since the efficiency was initially increased from some optimum value, the DOF can be increased until the desired radiometric efficiency level is reached.

5 Claims, 4 Drawing Sheets

IMAGING SYSTEM USING A GRADIENT INDEX LENS ARRAY WITH IMPROVED DEPTH OF FOCUS

BACKGROUND AND MATERIAL DISCLOSURE STATEMENT

The present invention relates to an imaging system which includes a gradient index lens array to focus light onto an image plane, and more particularly to a gradient index lens array modified so as to increase the depth of focus of the array without any loss of radiometric efficiency. Light transmitters comprising bundled gradient index optical fibers, or rods, are known in the art. U.S. Pat. No. 3,658,407 describes a light conducting rod made of glass or synthetic resin which has a refractive index distribution in a cross section thereof that varies parabolically outward from a center portion thereof. Each rod acts as a focusing lens for light introduced at one end. The rod lenses are produced under the trade name "SELFOC"; the mark is registered in Japan and owned by Nippon Sheet Glass Company, Ltd. Relevant optical characteristics of gradient index lens arrays are described in an article entitled "Optical properties of GRIN fiber lens arrays: dependence on fiber length", by William Lama, Applied Optics, Aug. 1, 1982, Vol. 21, No. 15, pages 2739-2746. This article is hereby incorporated by reference.

These rod lens arrays have found utility in a number of document imaging systems. Typically, an assembly of rods are arranged linearly in a one row or a staggered two row array. The arrays are used as a replacement for conventional optical systems in copiers as disclosed in U.S. Pat. Nos. 3,947,106 and 4,193,679. The arrays are also used in a Raster Input Scanner (RIS) to focus light reflected from a scanned document onto photosensors which electronically capture the scanned image (see, for example, U.S. Pat. No. 4,509,826). The arrays are also used in conjunction with printers which utilize LED print bars as the imager to expose a photoreceptor surface. The gradient index lens array is positioned between the LED print bar and the photoreceptor surface to transmit the light output from the activated LED emitters as focused light spots on the photoreceptor surface. U.S. Pat. No. 4,801,978, for example, shows a printer with a single print bar imager. U.S. Pat. No. 5,166,999 discloses a single pass printer with a plurality of print bars positioned adjacent to the surface of a photoreceptor belt, each print bar having an associated gradient index lens array. This system forms successive registered color images on the surface of a photoreceptor.

For those scanning applications where the lens arrays are focusing light reflected from a document platen, adequate depth of focus (DOF) is a critical concern. For LED print bar systems, adequate DOF at the photoreceptor is also a critical concern. For both types of applications, it is desirable for the DOF of the gradient index lens array to be as large as possible consistent with optimum radiometric efficiency. The DOF of a conventional lens can be increased by increasing the relative aperture or f/# of a conventional lens. FIG. 1A illustrates a prior art imaging lens system. Lens L1 has an exit pupil diameter $D_1$, and a focal length FL and a depth of focus DOF. The f/# of the FIG. 1A system is the focal length FL divided by the diameter of the exit pupil or, $f/\# = FL \div D_1$.

It can be shown that two relationships exist for this prior art system. The radiometric speed is inversely proportional to $(f/\#)^2 = (D \div FL)^2$ and the DOF is proportional to $f/\#$ or $(FL \div D)$. The DOF of the optical system of FIG. 1A can therefore be increased to that shown in FIG. 1B (DOF') by using a lens L2 with a smaller exit pupil diameter $D_2$. The focal length FL remains the same for each system. However, by the first relationship above, radiometric speed equals $(f/\#)^2 = (D/FL)^2$, and there is a loss in radiometric speed for the system of FIG. 1B. It therefore follows that radiometric speed and DOF are diametrically opposed. DOF can be increased (by reducing the relative aperture) but only at a significant loss in radiometric speed. Likewise, radiometric speed can be increased but only with a reduction in DOF.

For the case of a gradient index lens array imaging system, it can be shown that the radiometric efficiency is proportional to the quantity $(n_o \sqrt{A} \times R)^2$ where $n_o$ is the axial refractive index of the optical rods, $\sqrt{A}$ is a lens gradient index constant and R is the radius of the individual rods. The DOF is inversely proportional to $n_o \sqrt{A} R$; e.g. $DOF \propto 1 \div n_o \sqrt{A} R$.

It is a desirable object, heretofore unrealized, to increase the DOF of a gradient index lens array while maintaining desired radiometric efficiency. The present invention sets forth a method for accomplishing this by changing the asymmetric effective aperture (exit pupil) of a conventional gradient index lens array into a general circularly symmetrical effective aperture by techniques described in detail below. These techniques, as will be seen, reduce the value of the quantity $n_o \sqrt{A} R$ to maintain a desired DOF while trading off against initially higher radiometric efficiencies. More particularly, the invention relates to an imaging system. An imaging system for focusing light from an object plane onto an image plane, said imaging system including a gradient index lens array comprising gradient index optical rods combined into at least two linear rows, each of said optical rods having an entrance pupil and an exit pupil and wherein a plurality of adjoining rods contribute to the exposure of a single point at the image plane, said plurality of rods having an effective exit pupil which has a generally circularly symmetric shape.

BRIEF DESCRIPTION OF THE DRAWINGS IN THE FIGURES

DESCRIPTION OF THE INVENTION

Figure 1A:
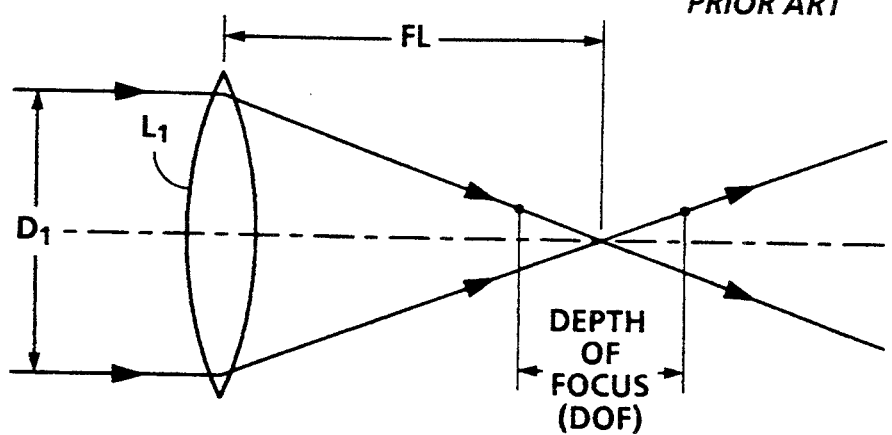
FIGS. 1A and 1B illustrate two conventional prior art optical systems and ways of increasing DOF by decreasing the diameter of the lens aperture while holding focal length constant.
Figure 1B:
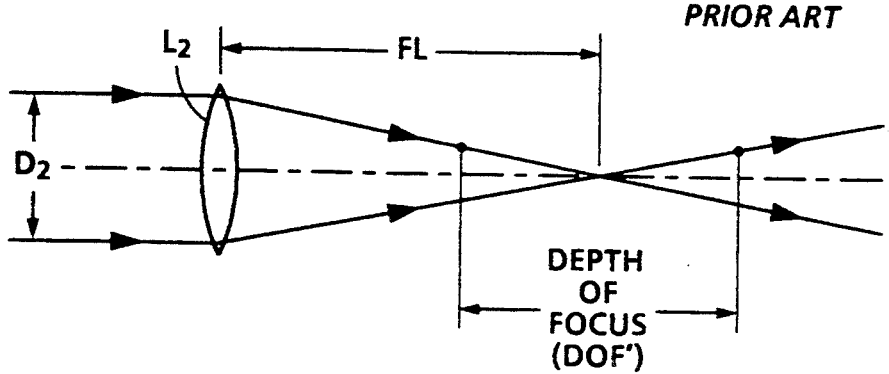

As briefly described above, the radiometric speed and the DOF of a gradient index lens array optical system are associated with the term $n_o\sqrt{A}R$. It has been found that unlike the conventional optical systems of FIGS. 1A and 1B, DOF can be increased while maintaining radiometric efficiency. In order to appreciate the invention, reference is made to FIG. 2A which shows, in perspective view, a prior art gradient index lens array 10 having two staggered rows 12, 14 of gradient index optical rods. For illustrative purposes, lens 10 is a commercial SLA 9 SELFOC lens. Each row 12, 14 is comprised of identical rods having the same radius R (and the same gradient index constant A). Lens array 10 can be used in any of the applications described in the above-identified references whose contents are hereby incorporated by reference. As example, light from an object plane 15 (which may be an illuminated document platen or a row of LED emitters) is transmitted through the lens array 10 and focused onto an image plane 16. The total exposure of a point in the image plane 16 for light emanating from a point in the object plane 15 is a summation of the exposure values of each of the rods contributing to the exit pupil 11 (shown shaded). The effective aperture or exit pupil 11, as shown enlarged in FIG. 2B, has an asymmetric shape being much larger in the array (X) direction than in a cross-array (Y) direction. Because of the inverse relationship of the DOF to the exit pupil diameter (for a constant focal length), the DOF of this lens array is relatively small in the X direction and larger in the Y direction. The larger DOF in the Y direction is of little practical value so the practical overall DOF of the lens is equal to the smaller value determined by the exit pupil diameter in the X direction. The radiometric efficiency for this particular prior art lens is 0.72% and the f/# is f/2.8.

According to a first aspect of the invention, the radiometric efficiency of a lens array is increased without changing the DOF. In a first embodiment shown in FIG. 3A, lens array 20 is realized by bundling four rows 22, 23, 24, 25 of gradient index optical fibers. Lens array 20 is a SLA 9 lens with the same total conjugate (TC) and fiber radius R, gradient constant A, and fiber length L as the prior art lens array of FIG. 2. With the configuration of FIG. 3, however, 16 fibers contribute to the exposure of an image point, the effective exit pupil 21, shown enlarged in FIG. 3B, being generally circularly symmetric. Array 20 is radiometrically 60% faster than the two row embodiment of FIG. 2 with an efficiency of 1.15% and a f/# of f/2.2. The DOF, however, is the same as a FIG. 2A embodiment but will be increased according to a second aspect of the invention as will be seen below following a description of a second lens array embodiment.

Figures 2A, 2B:
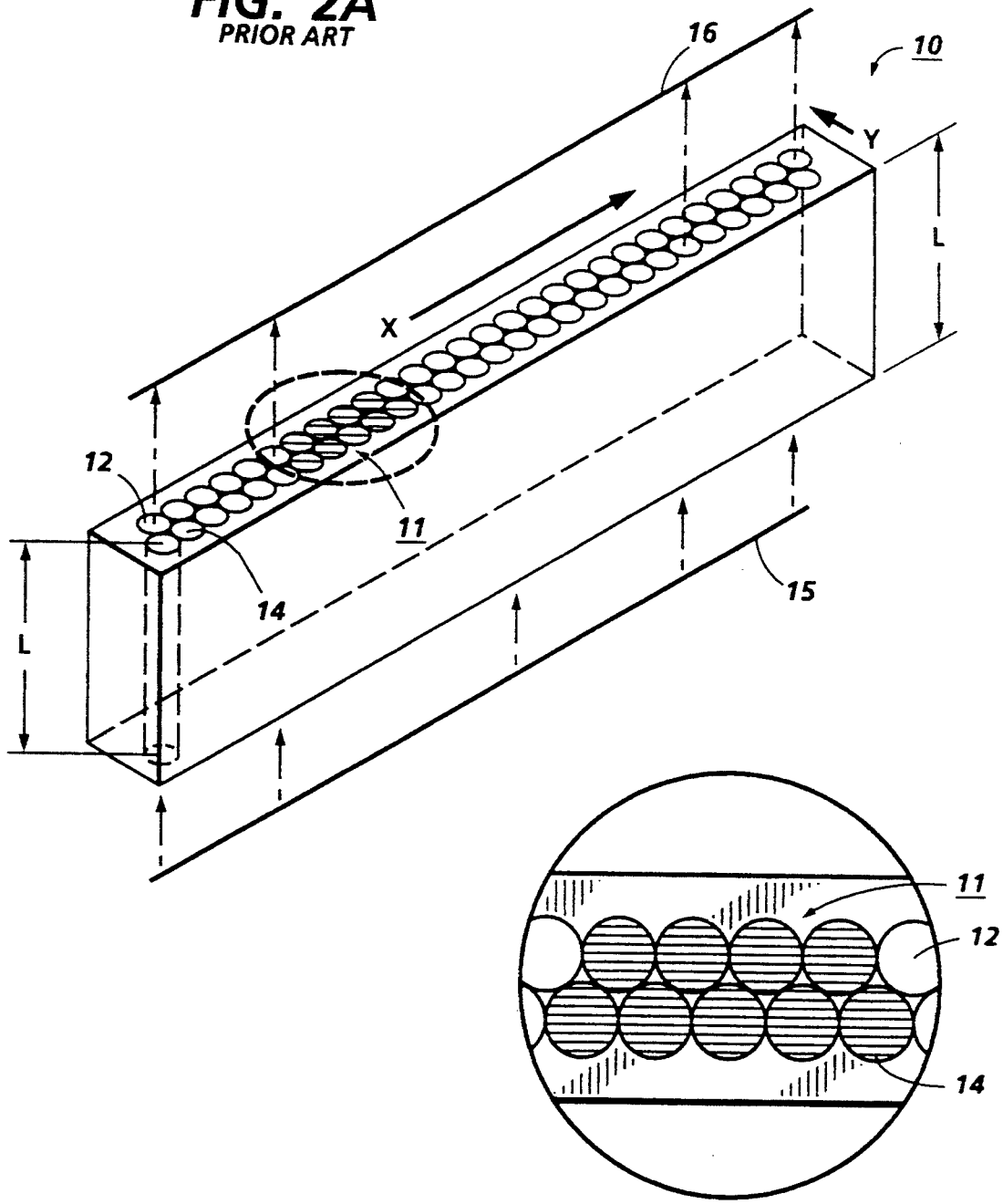
FIG. 2A shows the asymmetric exit pupil characteristic of a prior art two row gradient index lens array.
FIG. 2B shows an enlarged view of the exit pupil of FIG. 2A.
Figure 3A:
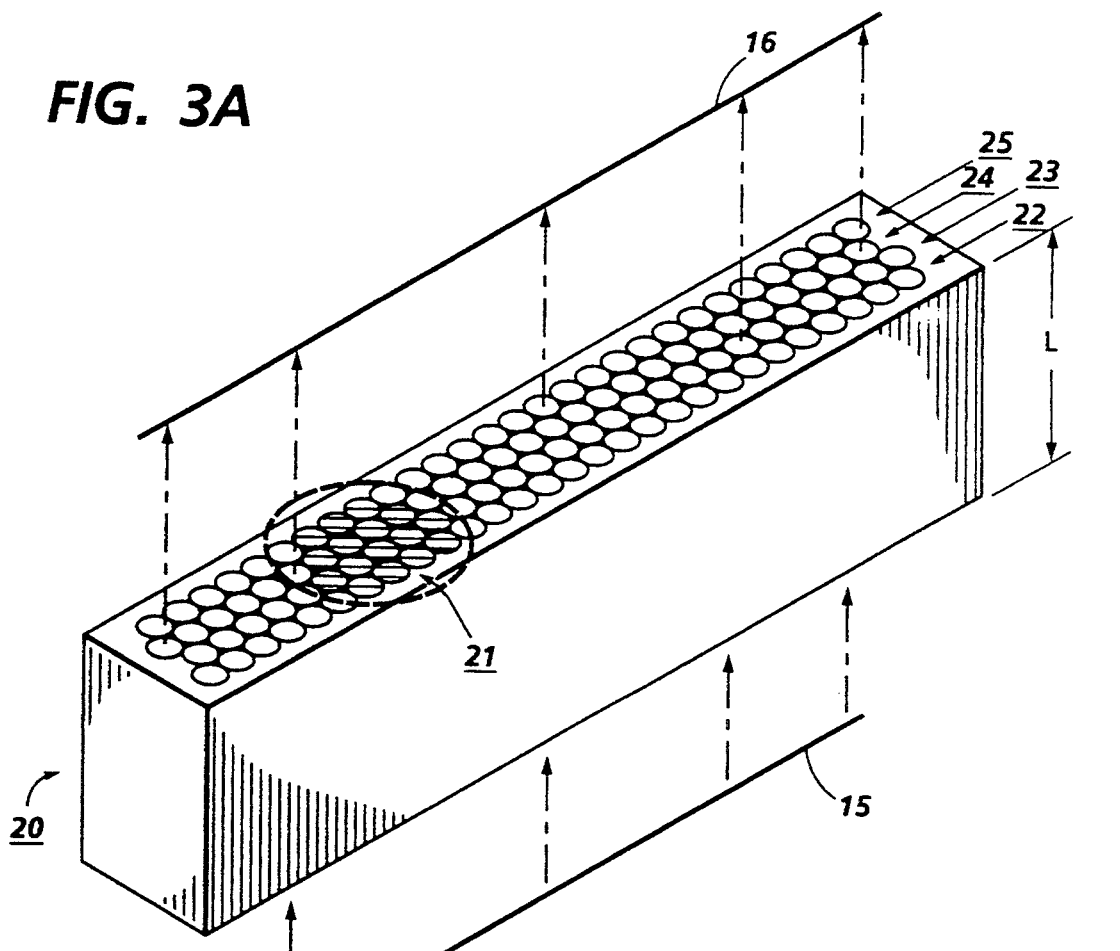
FIG. 3A shows a portion of a lens array with four staggered rows of gradient index optical rods changing the exit pupil to one that is nearly symmetrical.
Figure 3B:
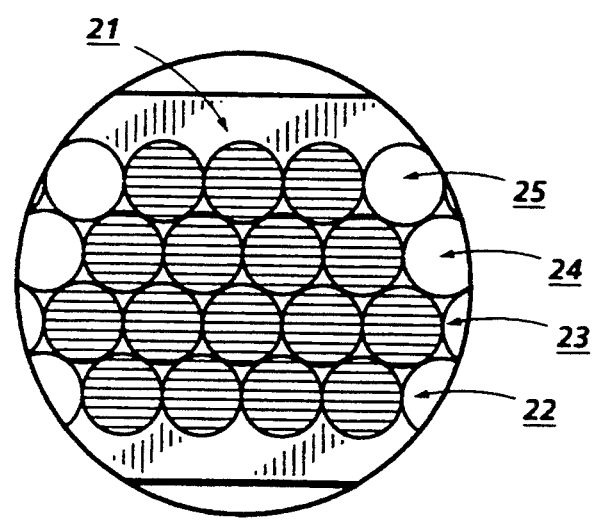
FIG. 3B shows an enlarged view of the exit pupil of FIG. 3A.
Figures 4A, 4B:
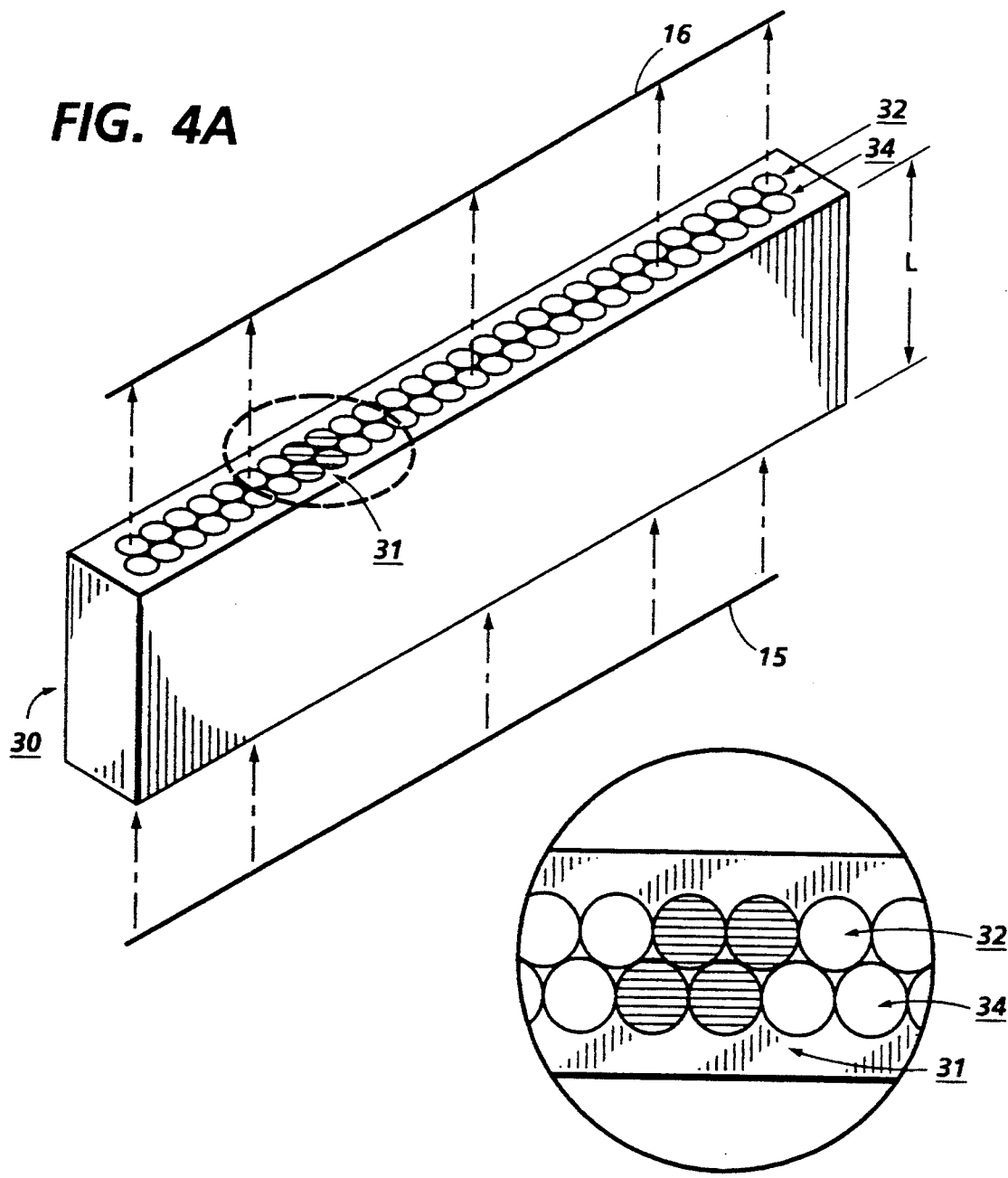
FIG. 4A shows a two row lens array with a symmetrical exit pupil enabled by reducing the "k" of the irradiance profile of each rod.
FIG. 4B shows an enlarged view of the exit pupil of FIG. 4A.

FIG. 4 shows a second embodiment of the invention wherein a lens array 30 is constructed with two staggered rows of gradient index optical rods 32, 34, each rod having a smaller irradiance profile radius k (0.97 mm) than in the FIG. 2A or FIG. 3A embodiment where k is 2.13 mm. As described in the Lama article referenced supra, each optical rod has both a radius R and an image plane exposure profile having a radius k. The value of k is given by the expression $k = -R \sec(\sqrt{A} L/2)$. The value of k can be reduced by reducing R, or increasing A or L, or a combination thereof. The change in radius k has the effect of reducing total conjugate TC (but not the focal length) to 34.3 mm. Fewer rods (4) are contributing to the image point exposure profile. The effective exit pupil 31, shown enlarged in FIG. 4B is more circularly symmetric and smaller. But the focal length has been reduced as well. The lens has actually gotten faster (the f/# has been reduced). Lens 30 is radiometrically 77% faster than the FIG. 2A array; its efficiency is 1.28% and f/# is f/2.1. The DOF is the same as the FIG. 2A embodiment.

To summarize, up to this point, the prior art lens array of FIG. 2A and the lens array embodiments of FIGS. 3A and 4A have the same DOF but the latter two arrays are radiometrically faster by 60 and 77%, respectively.

According to a second aspect of the invention, the DOF is increased for the two embodiments by reducing the value of the quantity $(n_o\sqrt{A}R)$ where $n_o$ is the axial refractive index of the fiber, $\sqrt{A}$ is the gradient index constant and R is the radius of the individual fibers. The DOF of arrays 20, 30 is inversely proportional to this quantity. Thus, by reducing the value of $(n_o\sqrt{A}R)$ for the arrays 20 and 30, the DOF is increased for both. The radiometric efficiency is simultaneously decreased, but, because of the higher efficiency realized by implementing the first aspect, a trade-off is now possible. For either lens, the radiometric efficiency can be reduced, if desired, from the 1.15% (for lens 20) or the 1.28% (for lens 30) down to the efficiency of the FIG. 2A lens (0.72%). Obviously, the efficiency can be reduced a lesser or greater amount. By way of example, if the value of $n_o\sqrt{A}R$ for arrays 20, 30 is reduced to the point where the efficiency is equal to the FIG. 2A array, the DOF of arrays 20, 30 can be increased by 26% and 33%, respectively. A reduction in the quantity $n_o\sqrt{A}R$ can be accomplished in at least two ways. A first method is to reduce the $\sqrt{A}$ constant by using a weaker standard SELFOC lens array. For example, changing from the prior art SLA 9 array to an SLA 6 array for a document scanning system, or from a SLA 20 to a SLA 15 array for an LED printing system. A second method is to reduce the rod radius accordingly. Since these values may also have been affected by the reduction of the value of "k" for the FIG. 4 embodiment, some calculations may be made to determine the optimum values when modifying the FIG. 4 embodiment.

While the embodiments disclosed herein is preferred, it will be appreciated from this teaching that various alternative, modifications, variations or improvements therein may be made by those skilled in the art, which are intended to be encompassed by the following claims:

I claim:

1. An imaging system for focusing light from an object plane onto an image plane, said imaging system including a gradient index lens array comprising gradient index optical rods combined into at least two linear rows, each of said optical rods having an entrance pupil and an exit pupil and wherein a plurality of adjoining rods contribute to the exposure of a single point at the image plane, said plurality of rods having an effective exit pupil which has a generally circularly symmetric shape.

2. The imaging system of claim 1 wherein said array has four staggered rows of optical rods.

3. A method for increasing the radiometric efficiency of an imaging system which focuses light from an object plane onto an image place including the steps of:

introducing a linear gradient lens array between the object and image planes, the lens array comprising gradient index optical rods, each rod having an entrance pupil and an exit pupil with a plurality of rods contributing to the exposure of a single point at the image plane, and modifying the effective exit pupil of said plurality of rods to create a generally circularly symmetric share.

4. The method of claim 3 wherein said step of modifying the exit pupil includes the step of forming the lens array with a staggered four row array of rods.

5. The method of claim 3 wherein said step of modifying the exit pupil includes the step of reducing the radius k of the exposure profile for each individual optical rod, k defined by the expression $k = -R \sec(\sqrt{A}L/2)$ where R is the radius of the individual rod, A is the gradient index constant and L is the length of the rod array.

* * * * *